No. 646,966. Patented Apr. 10, 1900.
C. FERM.
DRAFT EQUALIZER.
(Application filed Nov. 2, 1899.)
(No Model.)
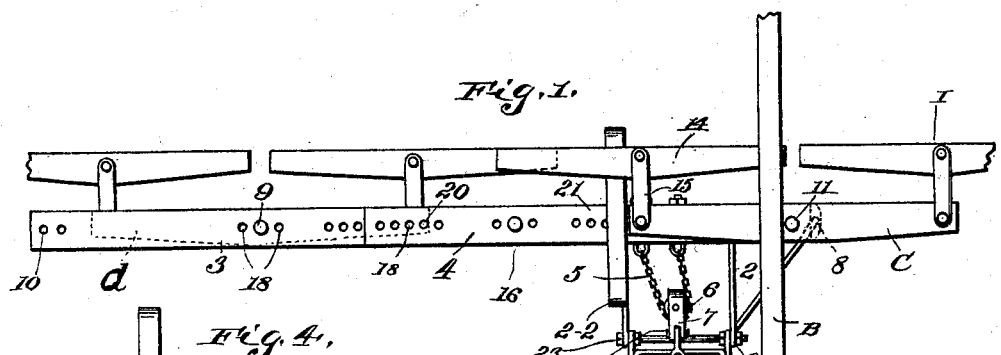
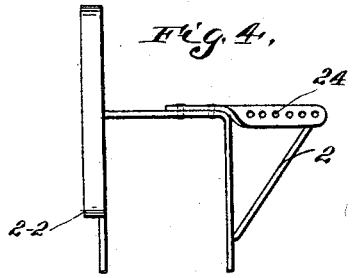
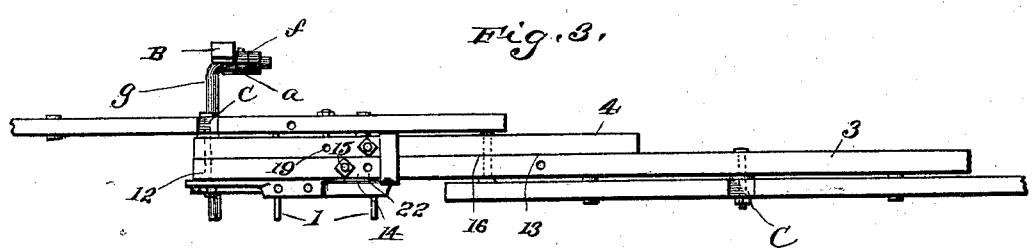
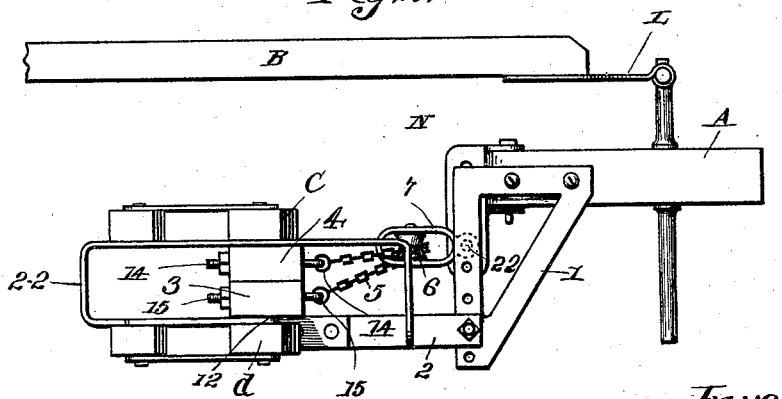
Witnesses:
J. Berglund.
G. A. Berglund.
Inventor:
Charles Ferm.
THE NORRIS PETERS CO., PHOTO-LITHO., WASHINGTON, D. C.

UNITED STATES PATENT OFFICE.

CHARLES FERM, OF LINDSBORG, KANSAS.

DRAFT-EQUALIZER.

SPECIFICATION forming part of Letters Patent No. 646,966, dated April 10, 1900.

Application filed November 2, 1899. Serial No. 735,595. (No model.)

*To all whom it may concern:*

Be it known that I, CHARLES FERM, a citizen of the United States, residing at Lindsborg, in the county of McPherson and State of Kansas, have invented a new and useful improvement in equalizing the draft on three, four, and five horses that walk abreast in the pulling of a sulky-plow or a gang-plow, of which the following is a specification.

The nature of the work in the pulling of a sulky-plow or a gang-plow is such that one horse walks in furrow on the right side of pole, and two, three, or four horses, as the case may be, walk on stubble-field on the left side of the pole. The plow (or plows) that turns and tilts the ground follows after the nearest horse on stubble-field. When more than three horses are used, one horse invariably walks on the plowed ground, so that the load or plow may be in the center of draft. This walking of one horse on the plowed ground is a waste of horseflesh, because the stirred ground is loose. To put three or more horses on the left side of the pole and only one horse on the right side of the pole causes side draft and causes the plow to take in more land than it can turn and pulverize.

My invention relates to the taking away, first, of the side draft; second, to enable the plow to follow the furrow; third, to work either three, four, or five horses to the same bars by simply adjusting it to either three, four, or five horses; fourth, to enable four or five horses to walk on solid ground, one in furrow the others on left side of pole on stubble ground; fifth, to enable operator to place the load on any point of the bars operator chooses to and still have a straight pull.

It is not the intention that one set of bars should be used for three and five horses, but that one set of bars should be used for sulky-plow three and four horses and for gang-plow four and five horses. The same principle operates on both sets. The sizes or lengths of bars are only different. As the drawings appear, it is adjusted for four horses; but the bars are made so that five horses can be used by moving doubletree $d$ and adjusting it to bar 3 by bolt 9 to hole 10 and by removing doubletree $c$, and on its pivot place a three-horse evener, securing the same by bolt 11 by removing bolt 16 and pushing bar 4 to the left, so that the right-hand singletree of the three-horse evener will be in the place of singletree I, as shown in the drawings, Figure 1. This will place five horses in a correct position for draft. Take now bolt 16 and put the same in one of the holes 18 in lower bar 3, (remember that doubletree $d$ has already been removed,) adjust upper bar 4 in one of the holes on it (also marked 18) on bolt 16, and make fast. Remove hooked bolts 14 and 15 that are attached to chain 5 and place 15 into hole 19 in upper bar 4, as shown in drawings, Fig. 3. Take bolt 14 that is in upper bar 4 and put the same in hole 13 in lower bar 3, make fast, and the evener is adjusted for five horses. For three horses remove doubletree $d$ and the supposed three-horse evener pivoted on 11. Secure doubletree to upper bar 4 by bolt 11, as shown in the drawings, Fig. 1. Take now a singletree and secure the same by bolt 9 under bar 3 at holes 20. Remove bolt 16 from holes 18. Adjust bar 4 by pushing the same to the right until doubletree $c$ is in position, as shown in Fig. 1 of drawings. Then place bolt 16 in holes 21 through lower bar 3 and upper bar 4, remove bolts 14 and 15, that are attached to chain 5, and place bolt 15 in the place where bolt 14 shows in the drawings, Fig. 3, and place bolt 14 in hole 22 in lower bar 3, as shown in Fig. 3. Make fast by nuts, and this adjustment will make a perfect equalizer for three horses.

A gang-plow is in all respects made as a sulky-plow, it being, as if it were, two sulky-plows abreast, one following the other, and whenever the evener is used to a gang-plow then clasp H is secured to the center frame-bar of the gang-plow, and thus removed from where it appears now in the drawings, Fig. 1, to such center bar.

In adjusting the equalizer from one adjustment to another take out bolt 16. Then place onto upper bar 4 doubletree if three or four horses are to be used or a three-horse evener of the David Bradley make (or any other ordinary three-horse evener) and secure the same by bolt 11. Now adjust bar 4 so that one horse may find room on the right side of pole A and two, three, or four horses, as the case may be, on the left side of pole. Now place the singletree in place for three horses or doubletree for either four or five horses, as the case may be. Now adjust the chain according to direction, and, as shown in the drawings, make fast. If now chain 5 should not be straight, adjust clasp H until it is straight. If that cannot then be done, adjust bolt 12 (shown in Fig. 3) in perforations 24 (shown in 2, Fig. 4) until it works satisfactory. If the operator has an uneven team, then pivoted bolt 16 may be adjusted to the advantage of the team or horse that the operator may see fit to benefit. When doubletrees are placed in position, then the adjustment depends upon the attachments of the chain 5. When now chain 5 is properly attached, then equalization depends on pivotal bolt 16. When equalization is secured, then position is gained by adjustment of clasp H and perforations 24 and bolt 12.

I attain these objects by the mechanism illustrated in the accompanying drawings.

Fig. 1 is a top view of the entire machine. Fig. 2 is a side view. Fig. 3 is an end view. Fig. 4 is a top view of Fig. 2.

All letters refer to parts that are not my invention, but with which my invention connects. All figures refer to parts that are my invention and connect with the parts described by letters.

The plow is not shown, neither are the horses. We must suppose these in place in order to accomplish the result intended.

Similar letters and figures refer to similar parts in all the views.

A is a portion of a sulky-plow frame to which my draft appliances are attached.

B is a guide-pole that is attached to plow-frame for the guidance of the plow and to be attached to horses by a neck-yoke.

3 and 4 are evener-bars pivoted together by bolt 16. To each of these bars is pivotally secured a doubletree $c$ and $d$, to which whiffletrees are secured in the usual manner.

To the plow-frame A is secured a perforated clasp H, which is adjustable on said frame A and pivoted on bolt K. To said clasp H is attached a block 7 by bolt 22, and pivoted thereon in said block 7 is a pulley 6, playing over bolt therein, having a chain 5 running over said pulley 6 in said block 7 and attached to said evener-bars 3 and 4 by hooked bolts 14 and 15. To said plow-frame A is secured by bolts two triangular and perforated brazes 1 1. Said brazes support a bolt 23, on which is a clevis 2, supported and pivoted thereon. Said bolt 23 is adjustable in the said perforations of 1 1. Said clevis 2 supports a groove 2 2, which is part of 2, and a perforated extension-arm and braze, which is also part of 2, as shown in Fig. 4 of drawings. Said clevis 2 supports an evener-bar 3, which is attached to 2 by bolt 12 and pivoted thereon. Said bar 3 extends to the left from said pivotal bolt 12 through groove 2 2 and has doubletree attached, as aforesaid, as shown in Fig. 1 of drawings. Said evener-bar 3 has chain 5 secured by bolt 15, as shown in Figs. 1 and 3. Said bar 3 supports evener-bar 4 and has the same attached to it by pivotal bolt 16, as shown in Figs. 1 and 3. In said plow-frame A is attached part of a post $g$ upright and having an angular arm, on which a sliding plate $l$ is secured by a collar E, in which is a set-screw F. To said plate $l$ is secured the rear end of guide-pole B. Said pole B, as secured to plate $l$, is perpendicularly pivoted upon arm on post $g$. Said post $g$ does not show its lower end, which consists of another angular arm extending in the opposite direction of upper arm at about an angle of forty-five degrees, to which a beveled wheel is attached, which is intended to run in a furrow for the guidance of the plow. The drawings do not show this. We must suppose it to be there.

Triangular brazes 1 1, as secured to frame A, support the whole device. Their purpose is to carry clevis 2 and resist the backward pressure caused by eveners 3 and 4 when the horses are pulling the plow and the plow is doing its work. The clevis 2 supports the evener-bars 3 and 4, is again itself supported by 1, 1, and pivoted and adjustable thereon. Its purpose is to secure bar 3 by pivotal bolt 12. Bar 3 is, as aforesaid, pivoted on 2. Its purpose is to support bar 4, which is attached to bar 3 by pivotal bolt 16. Bars 3 and 4 run through groove 2 2 in opposite directions, having chain 5 attached, and serve the purpose of conjointly doing the work of the device. In this work said bars 3 and 4 slide back and forth on each other as the team steps back and forth in the work. Their sole connection with 2 is pivotal bolt 12, and in order to keep them together in their work they are guarded by clasp 2 2 and secured in its groove. When the horses are hitched up, the bars 3 and 4 are lifted. 2 2 clasping 3 and 4, lifts the whole device and protects the appliances from breakage. Chain 5, as connected to bars 3 and 4, running over pulley 6 in block 7, and as the said block 7 is connected to clasp H, which again is secured to frame A, serves the purpose of pulling the plow when at work, all of which are connected together and coöperate to produce a useful result.

The principle on which the device works is double-action, a forward pull by bars on chain and a backward push by bars on supporting-clevis forming a resisting dead-center. This double-action is what enables the adjustment of bearings so that equalization becomes perfect.

I claim—

1. In draft-equalizers, a bar pivotal upon a dead-center said dead-center being attached to the load to be moved, and extending one way; a bar pivotal upon the first bar at any place required and extending along said first bar the other way; said bars being connected together by a chain one end of which being attached to the first or lower bar the other end attached to the second or upper bar, said chain running over pulley in a block attached to the load to be moved; both bars having doubletrees attached in proper places, and which are pivotal thereon.

2. In draft-equalizers; a plow or plow-frame, provided with triangular and perforated brazes 1 1, carrying a grooved and perforated clevis 2, which is pivotal and adjustable thereon; which again carries a perforated bar 3, which is pivotal and adjustable thereon in one end and extending one way through groove 2 2, having doubletree *d*, attached; which is pivotal and adjustable thereon, and a chain 5, attached which is adjustable in said perforations; said chain running over a pulley 6, which is supported by a block 7, which is again attached to clasp H, and adjustable thereon, said clasp H, being attached to plow-frame A, again said chain 5, being attached to bar 4, and adjustable thereon, said bar 4, being attached to bar 3, by pivotal bolt 16, and adjustable thereon, said bar running along bar 3, and on top thereof through 2 2, to doubletree *c*, which is again attached to bar 4, being pivotal and adjustable thereon all combined and arranged as set forth.

CHARLES FERM.

Witnesses:
REUBEN GOODHOLM,
C. J. BERGLUND.